United States Patent Office 3,472,791
Patented Oct. 14, 1969

3,472,791
**METHOD OF SPHERICAL CATALYST
PREPARATION**
Kenneth D. Vesely, La Grange Park, Ill., assignor to Universal Oil Products Company, Des Plaines, Ill., a corporation of Delaware
No Drawing. Filed Sept. 12, 1966, Ser. No. 578,516
Int. Cl. B01j *11/44*
U.S. Cl. 252—448                                                      4 Claims

ABSTRACT OF THE DISCLOSURE

An improved catalyst can be prepared by converting an inorganic oxide sol to gel particles, treating said gel particles while still in a wetted state with a solution of a catalytically active metal compound and thereafter drying and calcining the resultant composite. The catalyst is useful, inter alia, in hydrocarbon polymerization, alkylation and isomerization processes.

---

This invention relates to the preparation of catalytic composites wherein an inorganic oxide sol is converted to get particles which are thereafter composited with a catalytically active metal component. In particular, this invention relates to catalyst yields and it concerns a method for improving the same.

The preparation of those catalysts comprising a catalytically active metal component composited with inorganic oxide gel particles is generally accomplished by a series of process steps. The initial step concerns the preparation of the inorganic oxide gel and involves digesting a suitable metal compound in acid solution to form a hydrosol which is subsequently treated to form gel particles of predetermined size and shape. The latter is aged for a period of time at a predetermined temperature and pH value whereby the physical characteristics of the final catalytic composite are determined. Upon completion of the aging process, the gel particles are dried and calcined at a temperature to yield an inorganic oxide carrier material with desired surface area characteristics. A precursor of the catalytically active metal component, usually a water soluble compound thereof, is then composited with the gel particles by any one of several methods known to the art. In any case a repetition of the drying and calcining technique is required in order to activate the catalytic component and yield the desired catalyst.

In the process of drying and subsequent calcination of the gel particles formed from the sol, a degree of shrinkage occurs sufficient to impose stress and strain within the particles conducive to breakage and formation of so-called fines. This condition is particularly true with respect to a cogel comprising inorganic oxides, e.g. silica and alumina, which have unequal rates of contraction. The problem is further aggravated when the calcined gel particles are composited with a catalytic metal component requiring further drying and calcining at a temperature to activate the catalyst. The problem becomes increasingly acute as the amount of catalytic metal component composited with the calcined gel is increased.

It is an object of this invention to substantially minimize breakage of gel particles resulting from process conditions hereinabove described and thereby increase catalyst yield. In one of its broad aspects, the present invention relates to the preparation of catalyst composite wherein an inorganic oxide sol is converted to gel particles which are thereafter composited with a catalytically active metal component, and embodies the improvement which comprises treating said gel particles while still in a wetted state with a solution of a soluble compound of said catalytically active metal and thereafter drying and treating the resultant composite at calcination temperature.

Other objects and embodiments of this invention will become apparent in the following detailed specification.

In accordance with the improved method of this invention, an inorganic oxide gel is treated while still in a wetted state with a solution of a soluble compound of a catalytically active metal. The expression "wetted state" is employed to describe an inorganic oxide gel which may or may not have been freshly precipitated from a hydrosol but in any case has not previously been subjected to temperatures normally employed for drying prior to calcination (200–600° F.) and, in particular, has not previously been subjected to temperatures normally utilized to effect calcination (800–1400° F.). Generally, the inorganic oxide gel particles will have been basic aged and water washed. For example, in a preferred embodiment the inorganic gel particles comprise spheroidal particles of uniform physical characteristics formed by dispersing an inorganic oxide hydrosol in the form of droplets into a suitable gelling medium and, immediately thereafter, subjecting the resulting gel spheres to a particular series of aging treatments in a basic medium. The gelling medium may be any suitable water immiscible suspending liquid—usually a light gas oil chosen principally for its high interfacial tension with respect to water. Basic aging is usualy accomplished by initially commingling a weak base such as urea, hexamethylenetetramine, and the like, with the hydrosol before dispersing the same in the gelling medium as aforesaid. During the subsequent aging process, the weak base retained in each gel particle continues to hydrolyze forming ammonia and carbon dioxide.

Generally the spheres are retained in the gelling medium at a temperature of 120° F.–210° F. in a separate vessel to complete the aging process. The aging process usually further comprises an aqueous ammonia treatment before a final water wash to remove soluble matter. The basic aged, water washed spherical gel particles with extraneous water decanted or filtered therefrom are recovered in a wetted state and further treated in accordance with the method of this invention.

The catalyst prepared according to the present method may comprise any of the several catalytically active metallic materials in the oxidized or reduced state. Of particular interest are catalysts comprising a metal of Group VI–B and/or Group VIII including molybdenum, tungsten, chromium, iron, nickel, cobalt, platinum, palladium, ruthenium, rhodium, osmium and iridium, and particularly nickel and molybdenum. Pursuant to the present method, the inorganic oxide gel particles, while still in a wetted state, are treated with a solution of a soluble compound of a catalytically active metal. Thus, said inorganic oxide gel may be soaked, dipped, suspended or otherwise immersed in an aqueous solution of ammonium molybdate, ammonium paramolybdate, molybdic acid, molybdenum trioxide, ammonium chromate, ammonium peroxychromate, chromium acetate, chromous chloride, chromium nitrate, ammonium paratungstate, tungstic acid, nickel nitrate, nickel sulfate, nickel chloride, nickel acetate, cobaltous nitrate, cobaltous sulfate, cobaltous fluoride, ferric chloride, ferric nitrate, ferric sulfate, ferric acetate, platinum chloride, chloroplatinic acid, palladium chloride, chloropalladic acid, etc.

The advantages derived from the method of this invention are more pronounced when the inorganic oxide gel particles are a composite of two or more inorganic oxides such as silica-alumina, silica-zirconia, silica-alumina-zirconia, and the like. The method of this invention is particularly useful with respect to the preparation of catalyst composites wherein the inorganic oxide gel particle is a silica-alumina composite comprising from about 20 weight percent to about 65 weight percent alumina and further comprising a high level of catalytic metal component as has previously been mentioned. The following examples are presented in further illustration of the method of this invention and are not intended as an undue limitation on the generally broad scope of the invention as set out in the appended claims.

EXAMPLE I

This example relates to the preparation of "wet" spherical silica-alumina gel particles hereinafter utilized to demonstrate the improvement of this invention. Said particles were prepared by commingling a silica sol with an alumina sol and emitting the mixture as droplets into an oil suspending medium maintained at a temperature of about 217° F. and aging the resultant spherical particles for a 24 hour period. The silica sol was commingled with the alumina sol into a ratio to yield a composite comprising 63 weight percent alumina and 37 weight percent silica. The silica sol was prepared by acidification of a water glass solution containing 28 weight percent silica. Acidification was with sufficient hydrochloric acid to effect a chloride/sodium mole ratio of 1.2. Concurrently with acidification, a 40 weight percent aqueous urea solution (sufficient to effect 150 mole percent neutralization of the free chloride) was commingled with the water glass to effect subsequent basic aging of the silica-alumina gel upon slow decomposition at the aforesaid temperature of 217° F. The aforesaid alumina sol was prepared by digesting aluminum pellets in hydrochloric acid to attain an aluminum/chlorine ratio of 1.38, the sol containing 13.5 weight percent alumnium. Upon completion of the aging period the spherical gel particles were recovered and washed with a .05 weight percent ammonium nitrate solution at 200° F. The pH of the wash solution was 9.5.

EXAMPLE II

One portion (614.4 grams) of the "wet" silica-alumina composite of Example I was dried in an air atmosphere at a temperature ranging from 275° F. to 475° F. The dried composite was then calcined at a temperature ranging from 1025° F. to 1250° F. in air atmosphere for about 3 hours. The dried and calcined composite was thereafter soaked in 1600 cubic centimeters of an impregnating solution containing 95.2 grams of nickel nitrate hexahydrate, 282 grams of 85% molybdic acid and 354 cubic centimeters of 28 percent ammonia. The composite was allowed to soak for about 1 hour at room temperature and thereafter evaporated to dryness in a rotary steam drier. The dried composite was thereafter further treated at a temperature of 1100° F. for 1 hour in an air atmosphere. The resultant catalyst is hereinafter referred to as "catalyst A."

EXAMPLE III

The remaining portion (1270 grams) of the "wet" silica-alumina composite of Example I was soaked in 600 cubic centimeters of an impregnating solution without previous drying or calcining. The impregnating solution was an aqueous solution containing 38.8 grams of nickel nitrate hexahydrate and 115 grams of 85% molybdic acid and about 144 cubic centimeters of 28 percent ammonia. The composite was soaked for about 1 hour at room temperature and thereafter evaporated to dryness in a rotary steam drier. The dried composite was calcined at 1100° F. for 1 hour in an air atmosphere. The resultant catalyst is hereinafter referred to as "Catalyst B."

The finished catalysts were evaluated with respect to hydrocracking activity by means of a relative activity test. The test comprises processing a petroleum fraction boiling in the 690-875° F. range and 3,000 standard cubic feet per barrel recycle hydrogen over 100 cubic centimeters of a "standard" catalyst comprising 0.4% palladium and 75/25 silica-alumina base. The oil was processed over the catalyst at a liquid hourly space velocity (LHSV) of 1, 2 and 4. The liquid product was in each case distilled to determine the percent over at 650° F. and the results plotted against LHSV. The "standard" catalyst was arbitrarily assigned an activity number of 100. The activity of the sample catalyst was then determined by processing the oil over the sample catalyst at the aforesaid conditions, distilling the liquid product to determine percent over at 650° F., and plotting the result against LHSV. The relative activity of the sample catalyst was determined as the ratio of the LHSV required to yield a liquid product 60% of which distills over at 650° F., to the LHSV required for the same yield in the presence of the "standard" catalyst. The relative activity number is the fraction representing the aforesaid ratio multiplied by the activity number of the "standard" catalyst (100). That catalyst activity is not impaired by the method of preparation here disclosed and is apparent with reference to the following summary of physical testing of A and B.

FINISHED CATALYST PROPERTIES

| | Catalyst A | Catalyst B |
|---|---|---|
| ABD [1] | .575 | .620 |
| Breakage [2] | 21.4 | 5.7 |
| Activity | 115 | 105 |
| Surface Area [3] | 194 | 209 |
| Pore Volume [4] | 0.45 | 0.37 |
| Pore Volume, A | 96 | 53 |
| Nickel, weight, percent | 1.85 | 1.75 |
| Molybedenum, weight percent | 15.5 | 15.3 |
| Total spherical yield | 78.2 | 94.3 |

[1] Average bulk density, determined by weighing the finished catalyst particles which occupy 100 cubic centimeters, the procedure being repeated at least three times.
[2] Determined by sifting the finished catalyst and weighing the amount which passes through a .048" screen.
[3] Square meters per gram.
[4] Cubic centimeters per gram.

As has been mentioned, catalysts prepared in accordance with the method of this invention may comprise any of the several catalytically active metallic materials in the oxidized or reduced state, particularly the metals of Group VI-B and VIII. Thus, catalysts prepared in accordance with the method of this invention can be utilized to effect a variety of hydrocarbon conversion reactions involving reaction conditions comprising a temperature in the 70–1400° F. range. The catalysts are particularly useful in effecting the hydrocracking of heavy oils, including vacuum residuals, to form petroleum prdoucts in the middle distillage range utilizing temperatures of from about 500° F. to about 1000° F. and pressures of from about 500 p.s.i.g. to about 3000 p.s.i.g. Said hydrocarbon conversion reactions further include the polymerization of olefins, particularly ethylene, propylene, 1-butene, 2-butene, isobutylene and also higher boiling olefins, at polymerization reaction conditions. The catalysts are also useful in effecting the alkylation of isoparaffins with olefins or other alkylating agents including, for example, alkyl halides and the like, and particularly the alkylation of isobutane, isopentane, and/or isohexane with ethylene, propylene, 1-butene, etc., or mixtures thereof; and also the alkylation of aromatics with olfins or other alkylating agents, particularly the alkylation of benzene, toluene, etc., with propylene, amylene, and higher boiling olefins including nonenes, decenes, undecenes, etc., the forgoing alkylation ractions being effected at alkylation conditions disclosed in the art. The catalysts are further useful in the isomerization of paraffins, particularly n-butane, n-pentane, n-hexane, n-heptane, n-octane, etc., or mixtures including, isomerization of less highly branched chain saturated hydrocarbons such as the isomerization of 2- or 3-methylpentane to 2,3- and 2,2-dimethylbutane; isomerization of dimethylcyclohexane to methylcyclohexane, isomerization of dimethylcyclohexane to methylcyclohexane, isomerization of methylcyclopentane, to cyclohexane, etc., at isomerization reaction conditions. Other hydrocarbon conversion reactions including hydrocarbon transfer reactions, alkyl transfer reactions, transalkylation reactions, reforming of gasoline or naphtha to improve the antiknock characteristics thereof, are effectively catalyzed.

I claim as my invention:

1. In the preparation of a spherical catalyst wherein a mixed hydrosol of plural inorganic oxides is dispersed in the form of droplets into an oil gelling medium, and the resulting cogelled spherical particles are subjected to basic aging and thereafter composited with a catalytically active metal component, the improvement which comprises treating the basic aged spherical gel particles while still in a wetted state with a solution of a soluble compound of said catalytically active metal and thereafter drying and treating the resultant composite at calcination temperature, whereby to provide an increased yield of spherical catalyst having superior breakage resistance.

2. The improvement of claim 1 further characterized in that said inorganic oxide gel particles are spherical silica-alumina particles comprising from about 20 to about 65 weight percent alumina.

3. The improvement of claim 2 further characterized in that said catalytically active metal component is a metal of Groups VI–B and VIII of the Periodic Table.

4. The improvement of claim 3 further characterized in that said catalytically active metal component comprises nickel and molybdenum.

References Cited

UNITED STATES PATENTS

| | | | |
|---|---|---|---|
| 1,797,804 | 3/1931 | Stoewener | 252—451 |
| 2,005,412 | 6/1935 | Connolly et al. | 252—451 X |
| 2,381,825 | 8/1945 | Lee et al. | 252—451 X |
| 3,210,293 | 10/1965 | O'Hara | 252—453 |
| 3,312,635 | 4/1967 | Liquori | 252—458 X |
| 3,342,751 | 9/1967 | Hayes | 252—451 X |
| 3,346,509 | 10/1967 | Stewart | 252—453 |

DANIEL E. WYMAN, Primary Examiner

C. F. DEES, Assistant Examiner

U.S. Cl. X.R.

252—453, 455, 458, 459